United States Patent
Gindele (10) Patent No.: US 6,681,054 B1
(45) Date of Patent: Jan. 20, 2004

(54) NOISE REDUCTION METHOD UTILIZING PROBABILISTIC WEIGHTING, APPARATUS, AND PROGRAM FOR DIGITAL IMAGE PROCESSING

(75) Inventor: Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/564,409

(22) Filed: May 1, 2000

(51) Int. Cl.[7] .............................. G06K 9/38; G06K 9/40
(52) U.S. Cl. .................. 382/272; 382/275; 382/254; 382/260
(58) Field of Search ................................. 382/173, 224, 382/254, 260, 272, 275; 348/606, 624; 358/1.9, 3.26, 3.27, 447, 461, 463

(56) References Cited

U.S. PATENT DOCUMENTS

| | | | | |
|---|---|---|---|---|
| 4,698,696 A | * | 10/1987 | Matsuo | 386/114 |
| 5,526,446 A | * | 6/1996 | Adelson et al. | 382/275 |
| 5,594,816 A | | 1/1997 | Kaplan et al. | |
| 5,671,264 A | | 9/1997 | Florent et al. | |
| 5,751,862 A | * | 5/1998 | Williams et al. | 382/260 |
| 5,799,111 A | * | 8/1998 | Guissin | 382/254 |
| 5,911,012 A | * | 6/1999 | Bernard et al. | 382/260 |
| 6,185,328 B1 | * | 2/2001 | Shiau | 382/173 |
| 6,185,336 B1 | * | 2/2001 | Clark et al. | 382/224 |
| 6,400,848 B1 | * | 6/2002 | Gallagher | 382/254 |
| 6,414,613 B1 | * | 7/2002 | Midya et al. | 341/143 |

OTHER PUBLICATIONS

Luo et al. (IEEE, vol. 7, No. 2, Apr. 1997, "A scene adaptive and signal adaptive quantization for subband image and video compression using wavelets").*
Rey et al. (IEEE, vol. 37, No. 9, Sep. 1989, "A parametrized family of nonlinear image smoothing filters").*
Pitas et al. (IEEE, 1993, Application of adaptive order statistic filters in digital image/image sequence filtering).*
J–S. Lee, "Digital Image Smoothing and the Sigma Filter," *Computer Vision, Graphics, and Image Processing* 24, 1983, pp. 255–269.
Arce et al., "Theoretical Analysis of the Max/Median Filter," *IEEE Transactions on Acoustics, Speech, and Signal Processing*, vol. ASSP–35, No. 1, Jan. 1987, pp. 60–69.
Nagao et al., "Edge Preserving Smoothing," *Computer Graphics and Image Processing* 9, 1979, pp. 394–407.

* cited by examiner

*Primary Examiner*—Andrew W. Johns
*Assistant Examiner*—Amir Alavi
(74) *Attorney, Agent, or Firm*—Thomas H. Close (57) ABSTRACT

A method of processing a digital image channel to remove noise, includes the steps of: identifying a pixel of interest; identifying at least two sampled local regions of pixels about the pixel of interest; calculating a noise free pixel estimate for each sampled local region of pixels; using the noise free pixel estimates, a noise model and the pixel of interest to calculate a probabilistic weighting factor for each noise free pixel estimate; and using the noise free pixel estimates and the probabilistic weighting factors for calculating a noise reduced pixel value.

41 Claims, 5 Drawing Sheets

NOISE REDUCTION METHOD UTILIZING PROBABILISTIC WEIGHTING, APPARATUS, AND PROGRAM FOR DIGITAL IMAGE PROCESSING

FIELD OF INVENTION

The present invention relates to a method, apparatus, and computer program for processing digital images to reduce noise.

BACKGROUND OF THE INVENTION

Many image processing noise reduction algorithms can be classified as non-linear spatial filters. Often these algorithms involve using the pixel values in a small local neighborhood surrounding the pixel of interest combined with some form of non-linear weighting and/or statistical conditions applied to the pixels in the neighborhood to derive a noise free estimate of the pixel of interest. The small local neighborhood is usually centered on the pixel of interest. For this class of noise reduction algorithms the filter size is fixed, meaning that all image pixels are processed with the same size local neighborhood. The most common shape to the local neighborhood is a rectangular region centered about the pixel of interest. Such a region can be characterized by a width and height. Usually the width and height dimensions are chosen to be symmetric.

An example of a fixed size rectangular region noise reduction algorithm is the Sigma Filter, described by Jong-Son Lee in the journal article "Digital Image Smoothing and the Sigma Filter", *Computer Vision, Graphics, and Image Processing*, Vol. 24, 1983, pp. 255–269. This is a noise reduction filter that uses a non-linear pixel averaging technique sampled from a rectangular window about the center pixel. Pixels in the local neighborhood are either included or excluded from the numerical average on the basis of the difference between the pixel and the center pixel. Mathematically, the Sigma Filter can be represented as $$q_{mn} = \Sigma_{ij} a_{ij} p_{ij} / \Sigma_{ij} a_{ij} \tag{1}$$

where:

$a_{ij} = 1$ if $|p_{ij} - p_{mn}| <= \epsilon$, $a_{ij} = 0$ if $|p_{ij} - p_{mn}| <= \epsilon$.

where $P_{ij}$ represents the pixels in the local surround about the center pixel $P_{mn}$, $q_{mn}$ represents the noise cleaned pixel, and $\epsilon$ represents a numerical constant usually set to two times the expected noise standard deviation. The local pixels are sampled from a rectangular region centered about the pixel of interest.

The Sigma Filter was designed for image processing applications for which the dominant noise source is Gaussian additive noise. Signal dependent noise sources can easily be incorporated by making the $\epsilon$ parameter a function of the signal strength. However, for both signal independent and signal dependent noise cases, the expected noise standard deviation must be known to obtain optimal results. The Sigma Filter performs well on highly structured areas due to the fact that most of the image pixels in the local neighborhood are excluded from the averaging process. This leaves high signal strength regions nearly unaltered. The filter also works well in large uniform areas devoid of image signal structure due to the fact that most of the local pixels are included in the averaging process. For these regions, the Sigma Filter behaves as a low pass spatial filter with a rectangular shape. This low-pass spatial filter shape does not filter very low spatial frequency components of the noise. The resulting noise reduced images can have a blotchy or mottled appearance in otherwise large uniform areas.

Regions in images characterized by low amplitude signal modulation, or low signal strength, are not served well by the Sigma Filter. For these regions, most of the local pixel values are included in the averaging process thus resulting in a loss of signal modulation. Setting the threshold of the filter to a lower value does reduce the loss of signal, however, the noise is left mostly the same.

Another example of a fixed size non-linear noise filter was reported by Arce and McLoughlin in the journal article "Theoretical Analysis of the Max/Median Filter", *IEEE Transactions Acoustics, Speech and Signal Processing*, ASSP-35, No. 1, January 1987, pp. 60–69, they named the Max/Median Filter. This filter separated the local surround region into four overlapping regions—horizontal, vertical, and two diagonal pixels with each region containing the center pixel. A pixel estimate was calculated for each region separately by applying and taking the statistical median pixel value sampled from the regions' pixel values. Of these four pixel estimates, the maximum valued estimate was chosen as the noise cleaned pixel. Mathematically the Max/Median Filter can be represented as $$q_{ij} = \text{maximum of } \{Z_1, Z_2, Z_3, Z_4\} \tag{2}$$

$Z_1 = \text{median of } \{p_{i,j-w}, \ldots p_{ij}, \ldots, p_{ij+w}\}$
$Z_2 = \text{median of } \{p_{i-w,j}, \ldots p_{ij}, \ldots, p_{i+w,j}\}$
$Z_3 = \text{median of } \{p_{i+w,j-w}, \ldots p_{i,j}, \ldots, p_{i-w,j+w}\}$
$Z_4 = \text{median of } \{p_{i-w,j-w}, \ldots p_{i,j}, \ldots, p_{i+w,j+w}\}$ where $q_{ij}$ represents the noise cleaned pixel, $Z_1$, $Z_2$, $Z_3$, and $Z_4$ represent the four pixel estimates, and $p_{ij}$ represents the local pixel values. The Max/Median Filter also reduces the noise present while preserving edges. For Gaussian additive noise, the statistical median value does not reduce the noise by as great a factor as numerical averaging. However, this filter does work well on non-Gaussian additive noise such as spurious noise.

Noise is most visible and objectionable in images containing areas with little signal structure, e.g. blue sky regions with little or no clouds. The Sigma Filter can produce a blotchy, or mottled, effect when applied to image regions characterized by low signal content. This is largely due to the rectangular geometric sampling of local pixels strategy. The radial region sampling strategy employed by the Max/Median Filter produces noise reduced images with less objectionable artifacts in image regions characterized by low signal content. For images with high noise content, the artifacts produced by radial region sampling strategy have a structured appearance.

Nagao and Matsuyama described an edge preserving spatial filtering technique in their publication, "Edge Preserving Smoothing," in *Computer Vision, Graphics, and Image Processing*, Vol. 9, pp. 394–407, 1979. Nagao formed multiple local regions about the center pixel by rotating a line segment inclusion mask pivoting about the center pixel. Imagine each spatial region of pixels corresponding to a different orientation of the hour hand of a clock. For each region, the statistical variance and numerical mean are calculated. The noise cleaned pixel value is assigned as the numerical mean of the region with the lowest statistical variance. This filter does not assume a prior knowledge of the noise magnitude. If the magnitude of the inherent image structure is greater than the noise, the Nagao filter will reduce some noise while preserving edge structure. Unfortunately, the filter suffers from two problems. The size of the statistical sampling is relatively small since only one local region effectively contributes to the pixel estimation process. The other problem with this filter results from the fact that some image structure content is always degraded due to the fact that at least one region's numerical mean replaces the original pixel value. In addition, significant artifacts (distortions to the true image structure) can occur.

U. S. Pat. No. 5,671,264, issued Sep. 23, 1997 to Florent et al., entitled "Method for the Spatial Filtering of the Noise in a Digital Image, and Device for Carrying Out the Method", describes a variation of the Sigma Filter and Max/Median Filter. This algorithm borrows the technique of radial spatial sampling and multiple pixel estimates from the Max/Median Filter. However, the algorithm expands the number of radial line segments to include configurations with more than four segments. The algorithm uses combinations of Sigma and Median Filters to form the individual region pixel estimates. These pixel estimates derived from the N regions are then combined by numerical averaging or taking the statistical median value to form the noise cleaned pixel value. A key component of this algorithm is the randomization of one of the three essential region parameters: length, orientation, and number of regions. The randomization of the filter parameters is performed on a pixel to pixel basis thus changing the inherent characteristics with pixel location. It is claimed that the randomization feature reduces the induced structured artifacts produced by the radial region geometry sampling method. The imaging application cited in U.S. Pat. No. 5,671,264 is medial x-ray imagery. This type of imagery is typically characterized by high noise content or a low signal-to-noise ratio. The structured artifacts introduced by the noise reduction algorithm are worse for low signal-to-noise ratio images.

U.S. Pat. No. 5,594,816, issued Jan. 14, 1997 to Kaplan et al. entitled "Computer Based Digital Image Noise Reduction Method Based on Over-Lapping Planar Approximation" describes a method of noise reduction including the steps of: a) identifying a pixel of interest; b) identifying multiple rectangular pixel regions which include the pixel of interest; c) calculating a noise free pixel estimate for each rectangular pixel region by performing a least squares fit of the pixels within the rectangular region with respect to a planar surface; d) calculating a goodness-of-fit statistical value of the planar model for the individual rectangular regions; and e) calculating a noise reduced pixel value using a weighted sum of the noise free pixel estimates based on the goodness-of-fit statistical values. While the method disclosed by Kaplan et al. involves weighting the multiple noise free estimates, the method is overly complicated and the calculation of the weighting factors is integrally related to the method of calculating the noise free pixel estimates.

The prior art methods of combining multiple pixel estimates from multiple local regions of pixels all suffer from an inability to effectively account for the expected image noise statistics. In structurally flat regions of images, the techniques of using the maximum of the estimates does not work well due to the fact that only one of the pixel estimates can contribute to the noise cleaning. Methods that use the arithmetic mean or median, work much better in flat regions but suffer from over cleaning image regions in spatially active regions. Furthermore, the methods that use the arithmetic mean or median statistics for combining multiple pixel estimates fail to take into account the noise level (expected image noise statistics) of the source imagery.

There is a need therefore for an improved noise reduction algorithm that operates well in both the flat and spatially active regions of an image and makes use of the expected image noise statistics.

SUMMARY OF THE INVENTION

The need is met according to the present invention by providing a method of processing a digital image channel to remove noise, that includes the steps of: identifying a pixel of interest; identifying at least two sampled local regions of pixels about the pixel of interest; calculating a noise free pixel estimate for each sampled local region of pixels; using the noise free pixel estimates, a noise model and the pixel of interest to calculate a probabilistic weighting factor for each noise free pixel estimate; and using the noise free pixel estimates and the probabilistic weighting factors for calculating a noise reduced pixel value.

The present invention overcomes the deficiency of using only one of the calculated noise free pixel estimates to form the noise reduced pixel value as exhibited by the Nagao et al. and Arce et al. algorithms. The present invention also overcomes the deficiency of using the median or mean methods of combining multiple noise free pixel estimates to form the noise reduced pixel as described by Nagao et al. and Florent et al. which gives too much emphasis to some of the noise free pixel estimates. The present invention allows all the calculated noise free pixel estimates to contribute in spatially flat image regions and for the noise free pixel estimates to contribute unequally in highly structured regions. Furthermore, the present invention adapts the amount of noise reduction based on the expected image noise level. This is achieved by the use of a probabilistic weighting factor which ranges in value based on the expected noise of the source imagery pixels.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

General Description of a Digital Imaging System.

Figure 2:
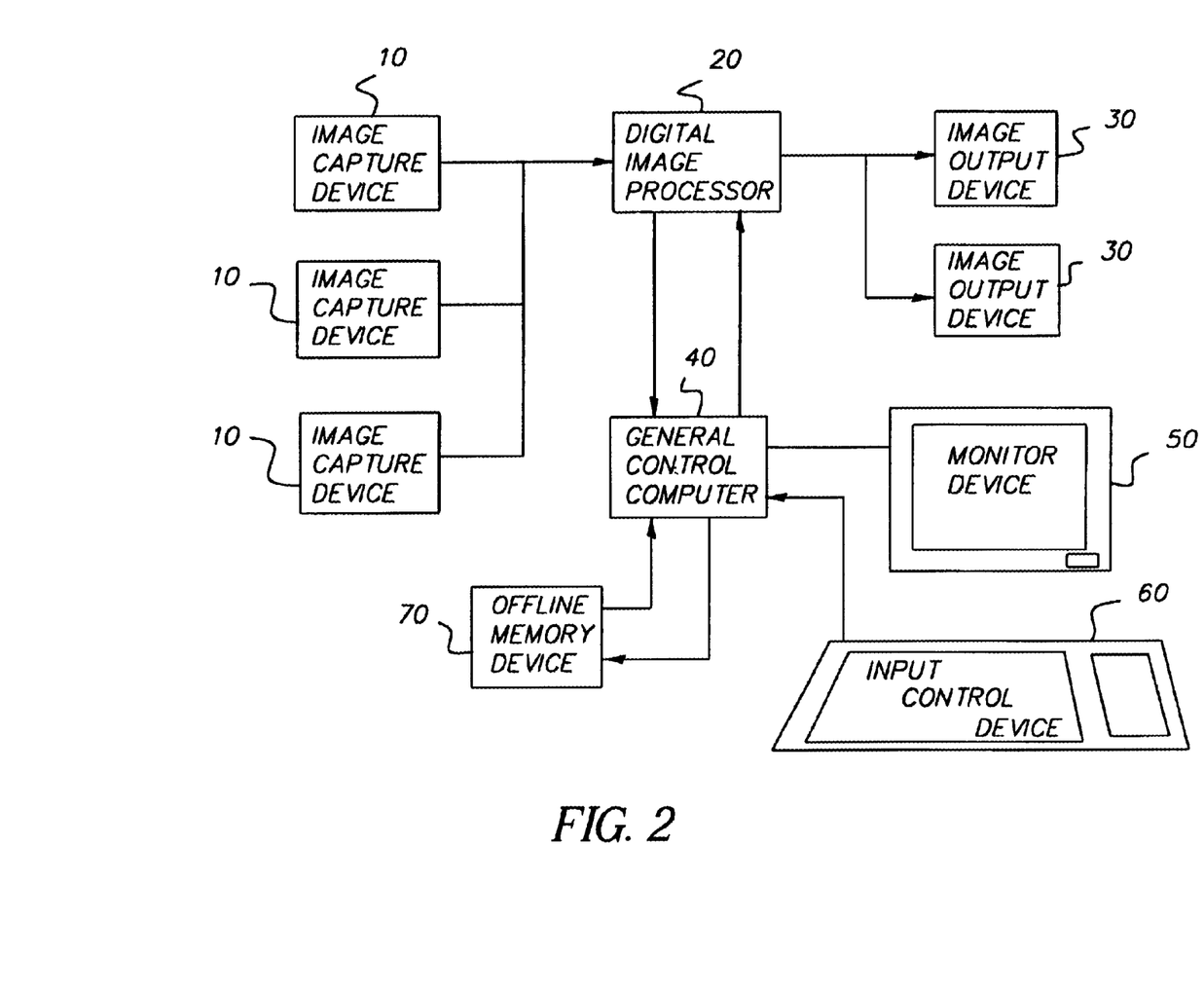
FIG. 2 is a functional block diagram showing the component parts of an apparatus implementation of the present invention.

The present invention may be implemented in computer hardware. Referring to FIG. 2, the following description relates to a digital imaging system which includes an image capture device 10, an digital image processor 20, an image output device 30, and a general control computer 40. The system may include a monitor device 50 such as a computer console or paper printer. The system may also include an input device control for an operator such as a keyboard and or mouse pointer 60. Multiple capture devices 10 are shown illustrating that the present invention may be used for digital images derived from a variety of imaging devices. For example, FIG. 2 may represent a digital photofinishing system where the image capture device 10 is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. Multiple image output devices 30 are shown illustrating that the present invention may be used in conjunction with a variety of output devices which may include a digital photographic printer and soft copy display. The digital image processor processes the digital image to adjust the overall brightness, tone scale, image structure etc. of the digital image in a manner such that a pleasing looking image is produced by an image output device 30. Those skilled in the art will recognize that the present invention is not limited to just these mentioned image processing modules.

The general control computer 40 shown in FIG. 2 may store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention implemented in a combination of software and/or hardware is not limited to devices which are physically connected and/or located within the same physical location. One or more of the devices illustrated in FIG. 2 may be located remotely and may be connected via a wireless connection.

A digital image is comprised of one or more digital image channels. Each digital image channel is comprised of a two-dimensional array of pixels. Each pixel value relates to the amount of light received by the image capture device 10 corresponding to the geometrical domain of the pixel. For color imaging applications a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications. In fact, the present invention can be applied to any two dimensional array of noise corrupted data to obtain a noise cleaned output. Although the present invention describes a digital image channel as a two dimensional array of pixel values arranged by rows and columns, those skilled in the art will recognize that the present invention can be applied to mosaic (non rectilinear) arrays with equal effect. Those skilled in the art will also recognize that although the present invention describes replacing original pixel values with noise cleaned pixel values, it is also trivial to form a new digital image with the noise cleaned pixel values and retain the original pixel values in tact.

General Description of a Digital Image Processor 20

Figure 3:
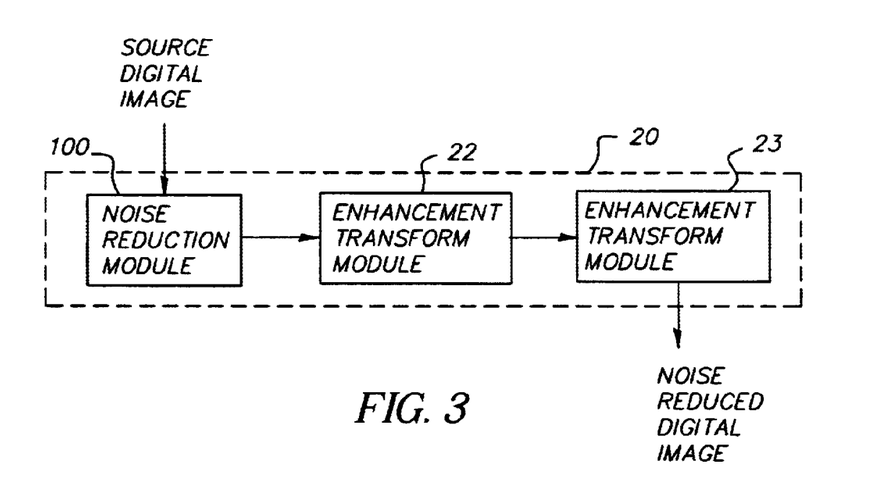
FIG. 3 is a functional block diagram of a method and software implementation of the image processor module employed by the preferred embodiment of the present invention.

The digital image processor 20 shown in FIG. 2 is illustrated in more detail in FIG. 3. The general form of the digital image processor 20 employed by the present invention is a cascaded chain of image processing modules. The source digital image is received by the digital image processor 20 which produces on output a processed digital image. Each image processing module contained within the digital image processor 20 receives a source digital image, modifies the source digital image, produces a processed digital image and passes the processed digital image to the next image processing module. Two enhancement transform modules 22 and 23 are shown within the digital image processor 20 to illustrate that the present invention can be used in conjunction with other image processing modules. Examples of enhancement transform modules 22 and 23 might include but are not limited to, modules designed to sharpen spatial detail, enhance color, and enhance the tone scale of a digital image. Alternatively, an image processing module may be employed to analyze the source digital image and may not immediately modify the pixels of the source digital image. The noise reduction module 100 receives the source digital image and produces a noise reduced digital image.

The noise reduction module 100 of the present invention implements a non-linear spatial filter noise reduction method. As such, the present invention relies on two main aspects which directly impact the image quality of results. A generalized non-linear spatial filter operation involves sampling the pixel values in multiple local region neighborhoods about a pixel of interest and applying mathematical logic to the local pixel values to calculate a noise free pixel estimate for each region, and calculating a single noise reduced pixel value from the multiple pixel estimates to form the processed pixel value. This procedure is repeated for some or all of the other pixels in the source digital image. A noise reduced digital image is formed from the processed pixel values.

Local Region Geometry

Figure 1:
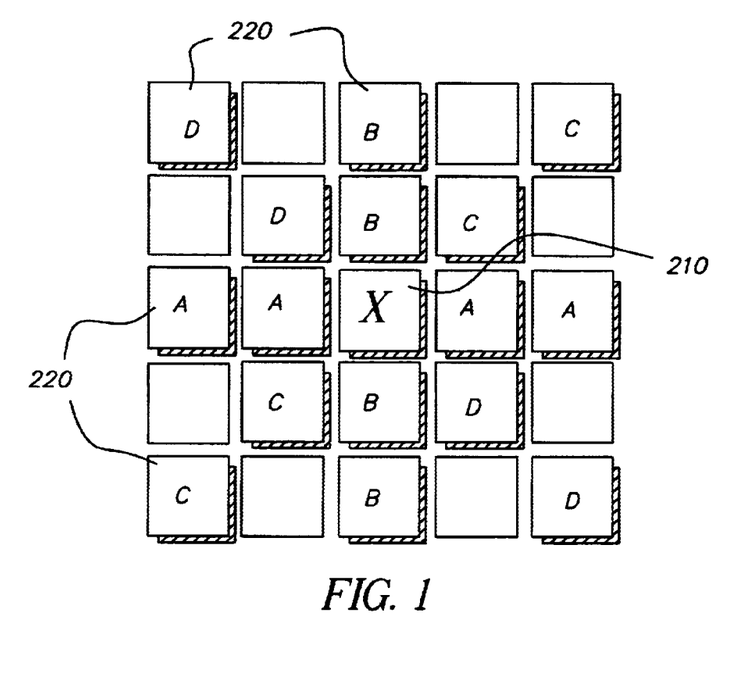
FIG. 1 is an example of the multiple sampled local regions of pixels for a 5 by 5 pixel neighborhood of pixels used by the preferred embodiment of the present invention.

The present invention uses more than one local region configured about a pixel of interest. FIG. 1 is an illustration of the multiple local regions sampled from a local neighborhood of pixels used by the preferred embodiment of the present invention. The pixels contained in the local region of pixels are segmented into local regions or groups of pixels with each local region including the pixel of interest 210 labeled with an X. The preferred embodiment of the present invention uses four local regions where the pixels of each local region are labeled with the letters A, B, C and D respectively. The pixels shown in FIG. 1 with no labels do not contribute to the noise reduction process for the pixel of interest 210. The four local regions shown in FIG. 1 each include the pixel of interest and are radially oriented with respect to the pixel of interest.

The local regions 220 illustrated in FIG. 1 are sampled from a 5 by 5 local neighborhood of pixels. The size of the local regions, or lengths of the radial configurations may be varied to achieve the system goals of compromises in computation resources versus effective noise removal. For example a local neighborhood of as little as 3×3 pixels to as large as 31×31 pixels have proven useful. As the size of the local region is increased, the demands on computation resources also increases. However, effective noise removal is also enhanced with larger local region size. According to a preferred embodiment, the present invention uses an 5 by 5 pixel local neighborhood of pixel as a reasonable compromise.

Figure 5:
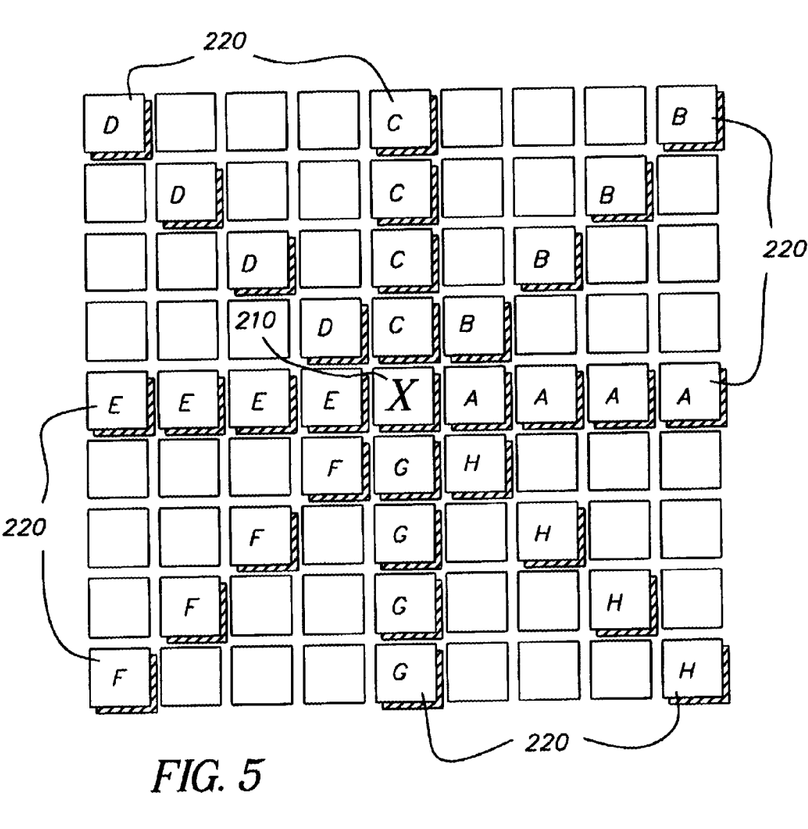
FIG. 5 is a diagram showing the multiple sampled local regions of pixels for a 9 by 9 pixel neighborhood of pixels used by an alternative embodiment of the present invention.

An alternative configuration of the local regions useful with the noise reduction method of the present invention is shown in FIG. 5. This alternative configuration uses eight local regions A, B, C, D, E, F, G and H. The eight local regions shown in FIG. 5 each include the pixel of interest and are radially oriented with respect to the pixel of interest but do not extend on both sides of the pixel of interest.

Figure 6:
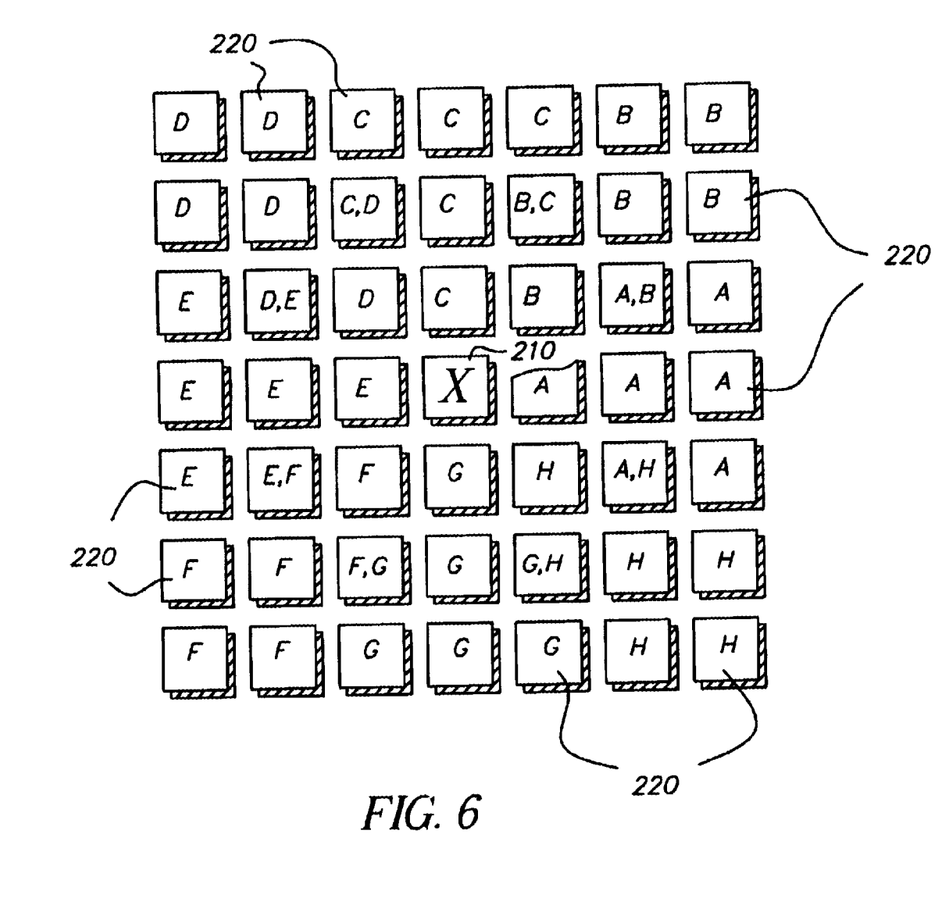
FIG. 6 is a diagram showing the multiple sampled local regions of pixels for a 9 by 9 pixel neighborhood of pixels used by a further alternative embodiment of the present invention.

The present invention may also be practiced with local regions about the pixel of interest which do not include the pixel of interest as shown in FIG. 6. In this configuration the eight local regions A, B, C, D, E, F, G and H are oriented about the pixel of interest, but are not simply linear arrangements of pixels, and some of the pixels are members of more than one local region. The local regions shown in FIG. 6 do not include the pixel of interest 210.

A further alternative embodiment of the present invention utilizes an additional local region consisting of just the pixel of interest. This embodiment of the present invention may be used with any of the other configurations of local regions of pixels. For example, referring to FIG. 1, the five local regions would be used labeled A, B, C and D, with the pixel of interest being the fifth local region. As with the other embodiments of the present invention, a noise free pixel estimate is generated for each of the local regions. The noise free pixel estimate for the local region which includes just the pixel of interest is given by the value of the pixel of interest. The inclusion of an additional local region of pixels where the additional local region contains just the pixel of interest provides a safety measure of noise reduction for digital imaging applications with subtle levels of noise. The inclusion of this feature results in noise reduced images with sharper detail but less overall noise reduction achieved. For some digital imaging applications this is a desirable compromise, while for others it is undesirable. The inclusion or exclusion of this feature is dependent on the type of expected imagery and the preference of the end users of the imagery.

Noise Reduction Module 100

Figure 4:
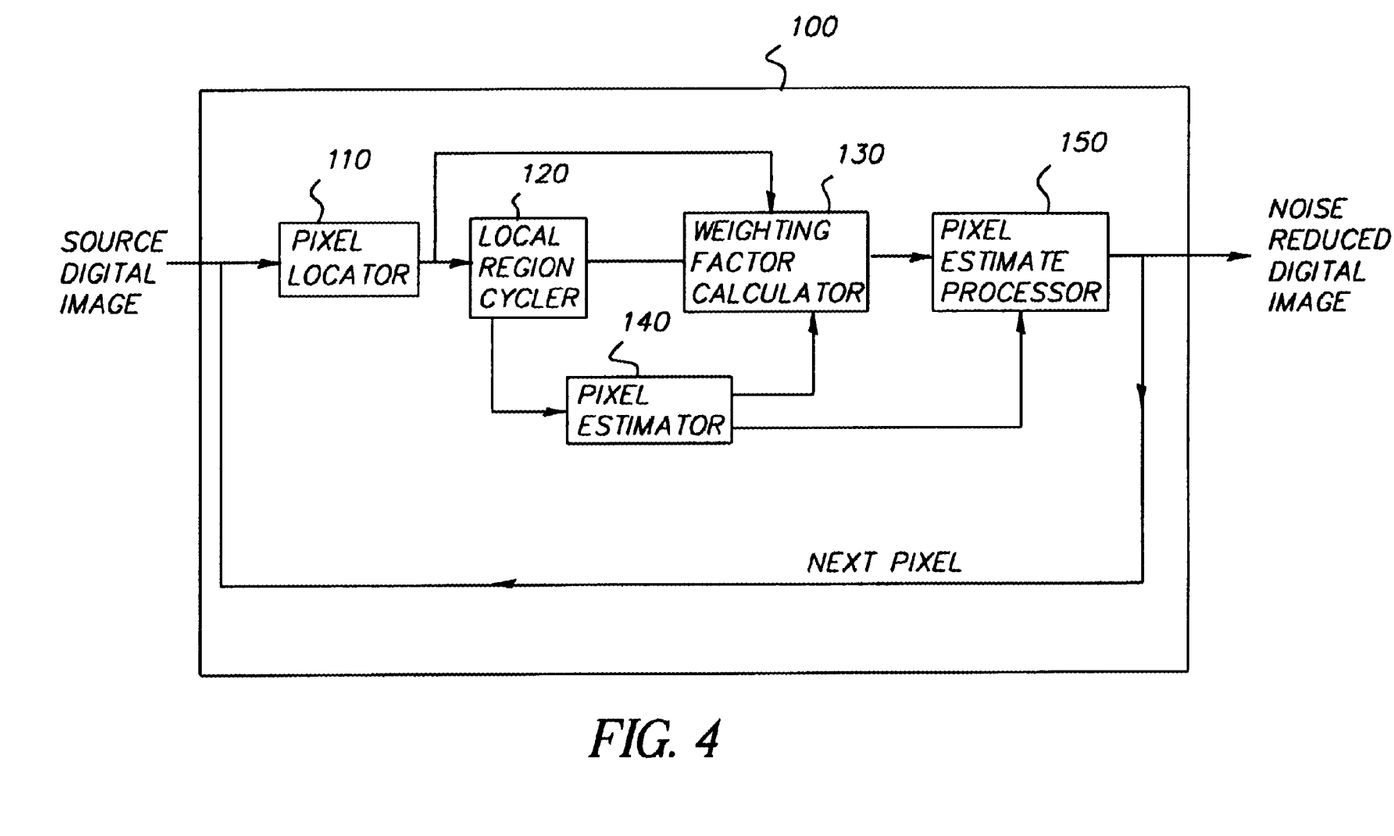
FIG. 4 is a functional block diagram of the noise reduction module shown in FIG. 3.

The noise reduction module 100 shown in FIG. 3 is illustrated in more detail in FIG. 4. The source digital image is received by the noise reduction module as one or more digital image channels. Each digital image channel is processed in sequence by the noise reduction module. The pixel locator 110 selects a pixel of interest. As illustrated, for example in FIG. 1, four local regions which include the pixel of interest, labeled A, B, C and D are defined. The local region cycler 120 selects one local region at a time starting with local region A. The pixels of local region A are received by the pixel estimator 140 which produces a noise free pixel estimate value. All the other local regions B, C and D, are caused to be processed in sequence by the local region cycler 120 in a similar manner. The weighting factor calculator 130 receives the value of the pixel of interest from the pixel locator 110 and the noise free pixel estimate values, and produces a probabilistic weighting factor corresponding to each noise free pixel estimate value. The pixel estimate processor 150 receives the noise free pixel estimates and the probabilistic weighting factors corresponding to the four local regions A, B, C and D, and calculates a noise reduced pixel value. The process continues by the pixel locator 110 selecting the next pixel of interest.

The noise reduction process may be repeated for all the pixels in the digital image channel and for all the digital image channels in the digital image. Alternatively, only a subset of pixels contained in the digital image channel can be processed for noise removal.

Weighting Factor Calculator 130

The weighting factor calculator 130 receives the noise free pixel estimate value for a given local region and calculates a probabilistic weighting factor $W_j$ based on the value of the pixel of interest and the noise free pixel estimate value. According to the present invention, the method of calculating the probabilistic weighting factor $W_j$ is related to the expected noise characteristics of the image pixels. Specifically, the probabilistic weighting factors are calculated by evaluating a noise probability function which describes, or models, the noise properties of image pixels. The noise model can be input to the weighting factor calculator, or in the case of a system where only one noise model is contemplated, can be a fixed part of the weighting factor calculator 130. In the preferred embodiment of the present invention, the noise model is implemented as a look up table containing probabilistic weighting factors Wj, and the table being addressed by the difference between the noise free pixel estimates and the value of the pixel of interest defining the index to the look up table. The values in the look-up table are defined, for example, according to equation (4) below.

Many noise sources encountered in digital imaging applications may be modeled as Gaussian additive noise sources. As such, a Gaussian probability function may be used to describe the likelihood of a pixel estimate being a good estimate of the true uncorrupted signal value. Let a probability function P(x) be given as $$P(x)=e^{-(x-x_o)^2/(2\sigma_n^2)} \qquad (3)$$

where $\sigma_n$ represents the standard deviation of the expected noise level, the variable x represents an estimate of the true uncorrupted signal value, and the variable $x_o$ represents true uncorrupted signal value.

The present invention calculates the probabilistic weighting factors $W_j$ based on Equation (3) with the variable $x_o$ given as the value of the pixel of interest $p_o$, the variable x given by the noise free pixel estimate $q_j$ corresponding to the $j^{th}$ local region. Equation (4) shows the mathematical formula for calculating the probabilistic weighting factors $$W_j = e^{-(q_j - p_o)^2/(2\gamma_n 2)} \quad (4)$$

where the variable $\gamma_n$ is a factor related to the expected noise level of the image pixels.

The preferred embodiment of the present invention uses a signal dependent noise feature incorporated into the expression for $\epsilon_n$ given by $$\gamma_n = Sfac\sigma_n(p_o) \quad (5)$$

where $\sigma_n$ represents the noise standard deviation of the source image pixels evaluated at the pixel of interest value $p_o$. The parameter Sfac is a scale factor that can be used to vary the degree of noise reduction. The optimum value for Sfac is somewhat a matter of view preference but good algorithm performance may be achieved with Sfac values in the range of 2.0 to 4.0. The implementation $\sigma_n$ is in the form of a look-up-table (LUT) of standard deviation values that are precomputed for the intended source of imagery. For color digital imaging applications a separate noise table $\sigma_n$ values is used—one for each digital image channel corresponding to each color of the color digital image.

Pixel Estimator 140

The preferred embodiment of the present invention for the pixel estimator 140 uses the median filter to calculate the noise free pixel estimate for each local region. The noise free pixel estimate produced with a median filter is derived by calculating the statistical median of values taken from the pixel values contained in the local region. If the pixels contained in the $j^{th}$ local region are numbered from 1 to M as $$p_{j1}, p_{j2}, \ldots, p_{jM} \quad (6)$$

then the value of the noise free pixel estimate $q_j$ is given by $$\text{median}(p_{j1}, p_{j2}, \ldots, p_{jM}). \quad (7)$$

The statistical median is an example of a rank order statistical value, meaning that the statistical value is derived by ranking the values of pixels within a set of pixels and choosing the statistical value based on the relative position or ranking within the set. The present invention may be practiced with other rank order statistical filters as the methods for calculating the noise free pixel values. The minimum, maximum represent other rank order statistical values.

An alternative embodiment of the present invention uses the Sigma Filter, described by Jong-Son Lee in his journal article, "Digital Image Smoothing and the Sigma Filter," as the noise reduction logic to calculate the noise free pixel value. The values of the pixels contained in each local region are compared with the value of the pixel of interest. Each pixel in the local region is given a weighting factor of one or zero based on the absolute difference between the value of the pixel of interest and the sampled pixel value. If the absolute value of the pixel difference is less than or equal to a threshold $\epsilon$, the weighting factor is set to one; otherwise, the weighting factor is set to zero. The threshold $\epsilon$ is set to two times the expected noise standard deviation. Mathematically the expression for the calculation of the noise reduced pixel value is given as:

$$q_j = \Sigma_k a_k p_{jk}/\Sigma_k a_k \quad (8)$$

where
$a_k = 1$ if $|p_k - p_{mn}| <= \epsilon$
$a_k = 0$ if $|p_k - p_{mn}| > \epsilon$ and $p_{jk}$ represents the $k^{th}$ pixel contained in the $j^{th}$ local region, $p_{mn}$ represents the value of the pixel of interest located at row m and column n, $a_k$ represents a weighting factor, $\epsilon$ represent a threshold value and $q_j$ represents the noise free pixel estimate.

The signal dependent noise feature incorporated within the weighting factor calculator 130 is also used to improve the noise reduction performance of the sigma filter logic method for calculating the noise free pixel estimates. Here the expression for $\epsilon$ is given by $$\epsilon = Sfac_2\sigma_n(p_{mn}) \quad (9)$$

where $\sigma_n$ represents the noise standard deviation of the source image evaluated at the pixel of interest value $p_{mn}$. The $\sigma_n$ is a noise level parameter that can vary with the value of the pixel of interest. This feature of the present invention can be employed to model signal dependent noise sources. The $\sigma_n$ values are preferably implemented by a lookup table that contains values of $\sigma_n$ and is addressed by the value of the pixel of interest. The parameter $Sfac_2$ is a scale factor that can be used to vary the degree of noise reduction. The optimum value for $Sfac_2$ is somewhat a matter of view preference but good algorithm performance may be achieved with $Sfac_2$ values in the range of 1.5 to 2.0.

Pixel Estimate Processor 150

Referring to FIG. 4, the pixel estimate processor 150 receives the probabilistic weighting factors $W_j$ and the noise free pixel estimates $q_j$ from the M regions. The noise reduced pixel value $q_{mn}$ corresponding to the pixel of interest is calculated by performing a weighted sum of the statistical weighting factors $W_j$. Mathematically, the calculation of the noise reduced pixel value $q_{mn}$ is given by $$q_{mn} = \frac{\sum_j q_j W_j^\eta}{\sum_k W_k^\eta} \quad (10)$$

where the summation includes all the M local regions and the $\eta$ parameter represents exponent of the statistical weighting factors $W_j$. Although a variety of values for $\eta$ will produce good results, the preferred embodiment of the present invention used a value of 2. With a value of 2 for c, the effective weighting factor is the inverse of the statistical variance of the pixel values contained in the individual local regions.

It is important to note that the key aspect of the present invention lies in the method of calculating the probabilistic weighting factors corresponding to the multiple noise free pixel estimates not in the method for calculating the noise free pixel estimates. In fact the present invention of probabilistically weighting multiple noise free estimates may be used with the Max/Median Filter disclosed by Arce and McLoughlin, the edge preserving spatial filtering technique described by Nagao and Matsuyama, the methods disclosed by Florent et al in U.S. Pat. No. 5,671,264, and the method disclosed by Kaplan et al. in U.S. Pat. No. 5,594,816.

Additionally, it should be noted that the present invention has taught a method for combining multiple noise free pixel estimates based on a probabilistic mathematical model. Although the present invention is disclosed with regard to a Gaussian probability model it is not limited to a Gaussian probability model. For example, if the noise statistics for a given digital imaging application were better described by a different mathematical function, such as a Laplacian function, the Laplacian function could be substituted for the Gaussian function. Matching the probability function used by the weighting factor calculator 130 shown in FIG. 4 to a statistical noise model of the image pixels is the ingredient of the present invention which provides the improved noise reduction results. It should be noted that as a matter of practicality, that probability functions that are approximate to the noise statistics of the image pixels will also yield acceptable results. For example, the threshold logic of the sigma filter may be used as a substitute for the Gaussian probability function.

The invention has been described in detail with particular reference to certain preferred embodiments thereof, but it will be understood that variations and modifications can be effected within the spirit and scope of the invention.

PARTS LIST 10 image capture device
20 digital image processor
22 enhancement transform module
23 enhancement transform module
30 image output device
40 general control computer
50 monitor device
60 input control device
70 offline memory device
100 noise reduction module
110 pixel locator
120 local region cycler
130 weighting factor calculator
140 pixel estimator
150 pixel estimate processor
210 pixel of interest
220 local region

What is claimed is:

1. A method of processing a digital image channel to remove noise, comprising the steps of:
   a) identifying a pixel of interest;
   b) identifying at least two sampled local regions of pixels about the pixel of interest;
   c) calculating a noise free pixel estimate for each sampled local region of pixels;
   d) using the noise free pixel estimates, a noise model of the expected noise level in the digital image channel and the pixel of interest to calculate a probabilistic weighting factor for each noise free pixel estimate; and
   e) using the noise free pixel estimates and the probabilistic weighting factors for calculating a noise reduced pixel value.

2. The method claimed in claim 1, wherein the noise model is a Gaussian probability function.

3. A computer program product for performing the method of claim 2.

4. The method claimed in claim 1, wherein the noise model is a Laplacian probability function.

5. A computer program product for performing the method of claim 4.

6. The method claimed in claim 1, wherein the noise free pixel estimate is calculated as a rank order statistical value derived from the values of the pixels from the sampled local regions of pixels.

7. The method claimed in claim 6, wherein the rank order statistical value is the statistical median of the pixel values in the sampled local region.

8. A computer program product for performing the method of claim 7.

9. A computer program product for performing the method of claim 6.

10. The method claimed in claim 1, wherein the noise free pixel estimate is calculated as a function of the difference between the value of the pixel of interest and the pixel values in the sampled local region.

11. A computer program product for performing the method of claim 10.

12. The method claimed in claim 1, wherein one of the sampled local regions is the pixel of interest.

13. A computer program product for performing the method of claim 12.

14. The method claimed in claim 1, wherein the sampled local regions include the pixel of interest.

15. A computer program product for performing the method of claim 14.

16. The method claimed in claim 1, wherein the sampled local regions do not include the pixel of interest.

17. A computer program product for performing the method of claims 16.

18. The method claimed in claim 1, wherein the probabilistic weighting factor is calculated using a noise level parameter to calculate the probabilistic weighting factors.

19. A computer program product for performing the method of claim 18.

20. The method claimed in claim 18, wherein the noise level parameter is dependent on the value of the pixel of interest.

21. A computer program product for performing the method of claim 20.

22. The method claimed in claim 1, wherein steps a) through e) are repeated for all pixels in the image.

23. A computer program product for performing the method of claim 22.

24. The method claimed in claim 1, wherein the image includes a plurality of channels and wherein steps a) through e) are repeated for all pixels in all of the channels of the digital image.

25. A computer program product for performing the method of claim 24.

26. The method claimed in claim 1, wherein the sampled local regions define radial patterns of pixels emanating from the pixel of interest.

27. A computer program product for performing the method of claim 26.

28. A computer program product for performing the method of claim 1.

29. Apparatus for processing a digital image channel to remove noise, comprising:
   a) means for identifying a pixel of interest;
   b) means for identifying at least two sampled local regions of pixels about the pixel of interest;
   c) means for calculating a noise free pixel estimate for each sampled local region of pixels;
   d) means for using the noise free pixel estimates, a noise model of the expected noise level in the digital image channel and the pixel of interest to calculate a probabilistic weighting factor for each noise free pixel estimate; and
   e) means for using the noise free pixel estimates and the probabilistic weighting factors for calculating a noise reduced pixel value.

30. The apparatus claimed in claim 29, wherein the noise model is a Gaussian probability function.

31. The apparatus claimed in claim 29, wherein the noise model is a Laplacian probability function.

32. The apparatus claimed in claim 29, wherein the noise free pixel estimate is calculated as a rank order statistical value derived from the values of the pixels from the sampled local regions of pixels.

33. The apparatus claimed in claim 32, wherein the rank order statistical value is the statistical median of the pixel values in the sampled local region.

34. The apparatus claimed in claim 29, wherein the noise free pixel estimate is calculated as a function of the difference between the value of the pixel of interest and the pixel values in the sampled local region.

35. The apparatus claimed in claim 29, wherein one of the sampled local regions is the pixel of interest.

36. The apparatus claimed in claim 29, wherein the sampled local regions include the pixel of interest.

37. The apparatus claimed in claim 29, wherein the sampled local regions do not include the pixel of interest.

38. The apparatus claimed in claim 29, wherein the probabilistic weighting factor is calculated using a noise level parameter to calculate the probabilistic weighting factors.

39. The apparatus claimed in claim 38, wherein the noise level parameter is dependent on the value of the pixel of interest.

40. The apparatus claimed in claim 29, wherein the image includes a plurality of channels and wherein means a) through e) are provided for each of the channels of the digital image.

41. The apparatus claimed in claim 29, wherein the sampled local regions define radial patterns of pixels emanating from the pixel of interest.

* * * * *